United States Patent
Jörissen et al.

(10) Patent No.: US 11,414,771 B2
(45) Date of Patent: Aug. 16, 2022

(54) NICKEL ELECTRODE, METHOD FOR MANUFACTURING SAME, AND USE THEREOF

(71) Applicant: ZENTRUM FÜR SONNENENERGIE- UND WASSERSTOFF-FORSCHUNG BADEN-WÜRTTEMBERT GEMEINNUTZIGE STIFTUNG, Stuttgart (DE)

(72) Inventors: Ludwig Jörissen, Neu-Ulm (DE); Jerry Bamfo Asante, Ulm (DE); Olaf Böse, New-Ulm (DE)

(73) Assignee: ZENTRUM FÜR SONNENENERGIE- UND WASSERSTOFF-FORSCHUNG BADEN-WÜR TTEMBERT GEMEINNÜTZIGE STIFTUNG, Stuttgart (DE)

( * ) Notice: Subject to any disclaimer, the term of this patent is extended or adjusted under 35 U.S.C. 154(b) by 39 days.

(21) Appl. No.: 16/613,337

(22) PCT Filed: May 9, 2018

(86) PCT No.: PCT/EP2018/062068
§ 371 (c)(1),
(2) Date: Nov. 13, 2019

(87) PCT Pub. No.: WO2018/210668
PCT Pub. Date: Nov. 22, 2018

(65) Prior Publication Data
US 2021/0079539 A1 Mar. 18, 2021

(30) Foreign Application Priority Data
May 18, 2017 (DE) .................... 10 2017 110 863.7

(51) Int. Cl.
*C25B 11/075* (2021.01)
*C25B 11/031* (2021.01)
(Continued)

(52) U.S. Cl.
CPC .............. *C25B 11/075* (2021.01); *C25B 1/04* (2013.01); *C25B 11/031* (2021.01); *C25B 11/051* (2021.01); *C25B 11/057* (2021.01)

(58) Field of Classification Search
CPC ... C25B 11/075; C25B 11/031; C25B 11/057; C25B 11/051; C25B 1/04
See application file for complete search history.

(56) References Cited

U.S. PATENT DOCUMENTS

| | | | |
|---|---|---|---|
| 5,084,154 A * | 1/1992 | Wakizoe | C25B 11/091 |
| | | | 204/290.13 |
| 5,635,313 A | 6/1997 | Abe | |

(Continued)

FOREIGN PATENT DOCUMENTS

| | | |
|---|---|---|
| CN | 104364425 A | 2/2015 |
| DE | 10 2015 120 057 A1 | 5/2017 |

(Continued)

OTHER PUBLICATIONS

Office Action dated Feb. 2, 2021 issued in corresponding Chinese Application No. 201880032415.3.

*Primary Examiner* — Nicholas A Smith
(74) *Attorney, Agent, or Firm* — Nath, Goldberg & Meyer; Jerald L. Meyer; Tanya E. Harkins

(57) ABSTRACT

Nickel electrodes having high mechanical stability and advantageous electrochemical properties, in particular, enhanced gas evolution in water electrolysis, are described. These electrodes comprising electrically conductive nickel wire mesh or a lattice-like nickel expanded metal webs, and a layer of mutually adherent nanoporous nickel particles (Continued)

applied only to either the nickel mesh wires or the nickel expanded metal webs, obtainable by partially reducing the spherical nickel hydroxide particles in a reducing atmosphere between 270 to 330° C. to obtain partially reduced, spherical Ni/NiO particles, producing a paste from the Ni/NiO particles, an organic and/or inorganic binder, a surfactant and, optionally, additional adjuvants, applying the paste as a coating to the electrically conductive nickel mesh or nickel expanded metal, and annealing the coated nickel mesh or nickel expanded metal in a reducing atmosphere at 500 to 800° C. A method for manufacturing the nickel electrode is also described.

10 Claims, 6 Drawing Sheets

(51) Int. Cl.
*C25B 11/057* (2021.01)
*C25B 11/051* (2021.01)
*C25B 1/04* (2021.01)

(56) References Cited

U.S. PATENT DOCUMENTS

| | | |
|---|---|---|
| 10,829,860 B2 * | 11/2020 | Jorissen ............... C25B 11/057 |
| 2002/0150821 A1 | 10/2002 | Fukuda et al. |
| 2014/0199591 A1 | 7/2014 | Geng |
| 2015/0064057 A1 | 3/2015 | Grigoropoulos et al. |
| 2015/0203976 A1 | 7/2015 | Noaki et al. |

FOREIGN PATENT DOCUMENTS

| | | |
|---|---|---|
| EP | 0 022 252 A1 | 1/1981 |
| JP | H3-75392 A | 3/1991 |
| JP | 2011-168849 A | 9/2011 |
| WO | 2013191140 A1 | 12/2013 |

* cited by examiner

← 30μm →

PRIOR ART

PRIOR ART

PRIOR ART

NICKEL ELECTRODE, METHOD FOR MANUFACTURING SAME, AND USE THEREOF

This is a National Phase Application filed under 35 U.S.C. 371 as a national stage of PCT/EP2018/062068, filed May 9, 2018, an application claiming the benefit of German Application No. 10 2017 110 863.7, filed May 18, 2017, the content of each of which is hereby incorporated by reference in its entirety.

FIELD OF THE INVENTION

The invention relates to a nickel electrode having a high-surface nickel layer of spherical nanoporous nickel particles, a method for manufacturing the nickel electrode, and use thereof, particularly as an electrode for water electrolysis.

TECHNICAL BACKGROUND AND PRIOR ART

In general, it is difficult to produce strongly adherent layers of nickel particles on nickel surfaces without application of contact pressure at elevated temperature. The layers formed are usually very easily detached from the substrate. A sintering process would require high contact pressure at elevated temperature and therefore represents an elaborate and costly process. Sintered nickel electrodes have been used inter alia for nickel-cadmium rechargeable batteries since 1928 and require sintering temperatures in the range of 800 to 1000° C. (AK Shukla, B. Hariprakash in SECONDARY BATTERIES—NICKEL SYSTEMS, Electrodes: Nickel. Page 407, Elsevier, 2009).

U.S. Pat. No. 4,605,484 describes an electrode for hydrogen evolution comprising an electrically conductive substrate having on it a coating of a chromium component and an oxide of at least one metal of nickel and cobalt, the coating being produced by melt spraying by means of a complex plasma spraying process.

EP 0 226 291 A1 describes a method for extending the service life of an electrode for hydrogen evolution that comprises an electrically conductive substrate and a coating of a metal oxide, a metal component of titanium or niobium, for example, being added to the alkaline electrolyte during hydrogen evolution. The metal oxide coating on the electrode can be produced by plasma or flame spraying, for example.

DE 2 002 298 describes a method for manufacturing electrodes for technical water electrolysis by applying a porous nickel layer to a metallic substrate, the porous nickel layer being anodized in an aqueous solution of alkali metal carbonates or alkali hydrogen carbonates, and the resulting oxidation product is subsequently reduced to finely distributed metallic nickel. The porous nickel layer is produced by flame spraying or electric arc spraying of metallic nickel onto a roughened metallic surface.

Various nickel electrodes are commercially available. For example, nickel-sintered electrodes with rod-shaped nickel particles are known (see FIG. 1 from Morioka Y., Narukawa S., Itou T., Journal of Power Sources 100 (2001): 107-116), nickel foam electrodes having a honeycomb structure (see FIG. 2) or nickel fiber electrodes having cylindrical nickel fibers (see FIG. 3 of Ohms D., Kohlhase M., Benczur-Urmossy G., Schadlich G., Journal of Power Sources 105 (2002): 127-133).

The aforementioned commercially available nickel electrodes serve as electrodes for batteries and are optimized for receiving active material.

U.S. Pat. No. 4,300,993 describes a method for producing nickel electrodes for alkaline electrolysis having a porous surface in which a suspension of nickel powder or a nickel alloy-containing powder and binder is applied to a steel sheet support and dried, whereupon the coating is sintered at an elevated temperature and a nickel/zinc alloy is electrolytically deposited on the sintered layer, and the zinc from the nickel/zinc alloy is extracted by immersion in caustic solution in order to produce porosity in the electrodeposited material. A wire mesh of nickel or iron can be used here as a metal substrate.

Conventional metal coating processes for metal meshes for the production of electrodes often lead to unwanted filling or sealing of the mesh openings, especially in the case of small wire spacing, which severely hampers gas transport. On the other hand, it is desirable to achieve the highest possible surface area as well as good gas transport in nickel electrodes in order to enhance productivity when used in hydrolyzers.

OBJECT OF THE INVENTION

It is the object of the invention to provide a nickel electrode having a strongly adherent nickel layer on an electrically conductive nickel substrate, possesses good mechanical stability, and has the highest possible surface area while avoiding the disadvantages of the prior art. Furthermore, the nickel electrode is to have advantageous electrochemical properties that to enable increased oxygen and hydrogen evolution and good gas transport, particularly during water electrolysis.

Moreover, a simple and cost-effective method for manufacturing the aforementioned nickel electrode is to be provided.

SUMMARY OF THE INVENTION

The above objects are achieved according to the invention by a nickel electrode according to claim 1, a method for manufacturing the nickel electrode according to claim 10, and the use of the nickel electrode according to claim 1.

Preferred or especially expedient embodiments of the subject matter of the application are specified in the subclaims.

The invention thus relates to a nickel electrode comprising an electrically conductive nickel mesh of nickel wires or a lattice-like nickel expanded metal comprising webs, and a nickel layer of mutually adherent, spherical, nanoporous nickel particles that is applied only to the wires of the nickel mesh or only to the webs of the nickel expanded metal, obtainable by a method comprising the following steps:

a) providing spherical nickel hydroxide particles,
b) partially reducing the spherical nickel hydroxide particles in a reducing atmosphere at temperatures of 270 to 330° C. in order to obtain partially reduced, spherical Ni/NiO particles,
c) producing a paste from the Ni/NiO particles obtained, an organic and/or inorganic binder, a surfactant and, optionally, additional adjuvants,
d) applying the paste as a coating to the electrically conductive nickel mesh or nickel expanded metal, and
e) annealing the coated nickel mesh or nickel expanded metal in a reducing atmosphere at temperatures of 500 to 800° C.

The invention also relates to a method for manufacturing such a nickel electrode, comprising the following steps:
a) providing spherical nickel hydroxide particles,
b) partially reducing the spherical nickel hydroxide particles in a reducing atmosphere at temperatures of 270 to 330° C. in order to obtain partially reduced, spherical Ni/NiO particles,
c) producing a paste from the Ni/NiO particles obtained, an organic and/or inorganic binder, a surfactant and, optionally, additional adjuvants,
d) applying the paste as a coating to the electrically conductive nickel mesh or nickel expanded metal, and
e) annealing the coated nickel mesh or nickel expanded metal in a reducing atmosphere at temperatures of 500 to 800° C.

Finally, the invention also relates to the use of the nickel electrode, particularly as an electrode for water electrolysis or other electrochemical reactions in an alkaline medium.

DETAILED DESCRIPTION OF THE INVENTION

The nickel electrode according to the invention is characterized by a nickel layer of mutually adherent, spherical, nanoporous nickel particles having a larger inner surface than hitherto commercially available nickel electrodes for batteries, such as foam, sintered, or fiber electrodes.

These superficially nanostructured nickel meshes or nickel expanded metals can be used for water electrolysis in alkaline media. Due to the high surface area, higher productivity can be achieved than in conventional hydrolyzers. However, this effect can also be used to reduce installation space while achieving constant productivity from water electrolysis.

The terms "nanoporous" or "nanostructured" are used here to refer to porous structures that have pore openings with a maximum diameter of about 500 nm—e.g., a diameter of 100 to 500 nm.

Nickel electrodes based on nickel meshes or nickel expanded metals with a nickel layer of spherical, nanoporous nickel particles are hitherto unknown in industrial practice. Surprisingly, it was found that the nickel electrodes according to the invention can be used to particular advantage for water electrolysis in an alkaline medium and are capable of substantially increased gas evolution in the production of oxygen and, in particular, of hydrogen. This surprising effect of enhancing gas evolution is obviously attributable to the high internal surface area of the nickel layers. Due to the high inner surface, the contact resistance of the electrode to the surrounding medium is very low, thereby increasing the current densities that can be achieved during water hydrolysis, for example, in comparison to uncoated nickel surfaces.

The method according to the invention makes it possible to obtain strongly adherent layers of nickel particles on the nickel wires or on the webs of the expanded nickel metals through simple process steps such as pressureless coating at room temperature and subsequent annealing of the coated nickel meshes or nickel expanded metals. The nickel electrodes produced in this way have a high mechanical stability, with the layers of spherical nickel particles remaining adhered even during and after mechanical deformation of the nickel substrates. In peel tests, holding forces of up to 350 N can be detected, which can be further increased by varying the process parameters.

Furthermore, the binders and surfactants used leave no troublesome carbon deposits on the surface of the nickel layers, since they can be vaporized without residue.

The lattice-like nickel expanded metals comprising webs used according to the invention comprising expanded nickel metals can also be referred to as nickel expanded metal mesh. They are usually manufactured by making staggered cuts without loss of material under simultaneous tensile deformation of the metal. The meshes of the lattice-like material made of sheets or strips are neither braided nor welded. Typical mesh shapes are diamond meshes, long-bond meshes, hexagonal meshes, round meshes, and square meshes.

The nickel meshes used according to the invention can likewise have different mesh shapes. In nickel meshes made from round wire, it is also possible to roll the nickel meshes before coating.

The mesh size of the 3D nickel structures used (meshes or expanded metals) is preferably in the range of 100 to 3000 µm, more preferably in the range of 100 to 1000 µm.

The spherical nickel hydroxide particles used according to the invention are commercially available as battery material (e.g., from the Belgian company Umicore, and the Japanese company Tanaka) and preferably have a mean particle size of from 0.3 to 75 µm, more preferably from 3 to 30 µm, especially preferably from 9 to 12 µm. Most preferred are those having a mean particle size of about 10 µm.

The partial reduction in step b) of the method according to the invention is carried out at temperatures of from 270 to 330° C., preferably from 290 to 310° C.

The partial reduction is suitably carried out over a period of 3 to 5 hours under the aforementioned conditions.

Both the partial reduction in step b) and the annealing in step e) of the method according to the invention takes place in a reducing atmosphere comprising for example 10 to 100%, preferably 10 to 50% hydrogen, and optionally an inert gas such as nitrogen, if the reducing atmosphere is not composed of 100% hydrogen.

Suitable organic binders for manufacturing a paste or suspension with the Ni/NiO particles obtained by partial reduction include, in particular, natural and/or synthetic polymers or derivatives thereof. Suitable examples are alkyd resins, cellulose and derivatives thereof, epoxy resins, polyacrylates such as polymethyl methacrylate (PMMA) and polyacrylic acid (PAA), polychlorotrifluoroethylene (PCTFE), polyhexafluoropropylene (PHFP), polyimides (PI) and derivatives thereof, polyurethanes (PU) and derivatives thereof, polytetrafluoroethylene (PTFE), polytrifluoroethylene (PTrFE), polyvinyl alcohol (PVA), polyvinylidene difluoride (PVDF), silicones, starch and derivatives thereof, styrene-butadiene rubber (SBR), and blends of the foregoing materials. Polyvinyl alcohols are especially preferred organic binders.

The quantity of surfactant used in the preparation of the paste or suspension in step c) is preferably 0.1 to 20 wt %, more preferably 2 to 10 wt %, based on the total weight of the paste or suspension. The surfactant is suitably selected from the group consisting of nonionic, ionic, and amphoteric surfactants.

Surfactants of the following classes of substances in particular can be used as surfactants for the preparation of the paste or suspension:

Anionic surfactants such as alkyl carboxylates, alkylbenzene sulfonates, secondary alkyl sulfonates, fatty alcohol sulfates, alkyl ether sulfates, taurides, olefin/paraffin sulfonates, sulfosuccinates, as well as phosphorous or phosphonic acid esters and salts thereof;

Cationic surfactants, such as quaternary ammonium compounds from the substance classes alkyltrimethylammonium, dialkyldimethylammonium, alkylbenzyl, and ethoxylated alkylammonium chlorides and bromides;

Nonionic surfactants such as alcohol ethoxylates, oleyl cetyl alcohol ethoxylates, nonyl/undecanol ($C_9/C_{11}$) ethoxylates, isodecyl alcohol ($C_{10}$) ethoxylates, lauryl myristyl ($C_{12}$-$C_{14}$) ethoxylates, isotridecyl ($C_{13}$) ethoxylates, nonylphenol ethoxylates, castor oil ethoxylates, and other alcohol ethoxylates;

Amphoteric surfactants such as betaines and sultaines from the substance classes carboxyglycinates, iminopropionates, iminoglycinates, fatty acid amidopropylbetaines, and fatty acid amidopropyl hydroxysultaines;

Nonionic, amphoteric surfactants such as fatty alcohol ethoxylates EO/PO adducts, alkyl polyglucosides, polysorbates, fatty acid diethanolamides, and amine oxides;

Nonionic surfactants having a hydrophilic polyethylene oxide chain and an aromatic hydrocarbon group, for example, which may be lipophilic or hydrophobic, such as polyethylene glycol tert-octylphenyl ether, have been found to be especially suitable.

Surprisingly, the addition of surfactants to the paste or suspension prevents the closing of the openings of the nickel mesh or nickel expanded metal in which the paste or slurry apparently contracts along the wires of the nickel mesh or along the webs of nickel expanded metal during the subsequent application of the paste as a coating to the electrically conductive nickel mesh or nickel expanded metal.

For the suspension or paste preparation, it is optionally possible to add additional conventional adjuvants such as organic or inorganic solvents or dispersants.

Ammonium salts or hydrazine salts in aqueous media are especially suitable as inorganic binders.

The final annealing of the coated nickel mesh or nickel expanded metal is carried out at temperatures in the range of 500 to 800° C., preferably 600 to 700° C. The final annealing is typically performed over a period of 3 to 5 hours. The final annealing is used to completely reduce the Ni/NiO particles in order to obtain a nickel layer of strongly adherent, spherical, nanoporous nickel particles. Furthermore, it should be ensured that the binders, surfactants and, if applicable, adjuvants used are completely removed or evaporate without leaving any residue.

The nickel layer of the nickel electrode according to the invention preferably has a thickness in the range of 1 to 1,000 μm, more preferably 10 to 900 μm, and especially preferably 20 to 200 μm.

The spherical, nanoporous nickel particles preferably have a mean particle size of from 0.1 to 25 μm, more preferably from 1 to 10 μm, even more preferably from 2 to 6 μm, and especially preferably from 3 to 4 μm.

Doping of the nickel layers of porous nickel particles is also possible according to the invention. The doping of the particles with foreign ions can be performed before, during, or after annealing.

The nickel electrodes according to the invention are used particularly as working electrodes in standard batteries, rechargeable batteries, symmetrical and asymmetric double-layer capacitors, sensors, as catalyst supports, as electrodes in electrochemical syntheses, or in photoelectric and photocatalytic devices, in particular for water electrolysis in an alkaline medium.

Included in particular are applications in electrolysis, such as chlor-alkali electrolysis, catalysis, in photovoltaic coatings, as well as in photovoltaic hydrogen production.

As a result of the surface nanostructuring, the nickel meshes or nickel expanded metals that are used according to the invention have an increased surface area and thus facilitate a simpler charge and mass transfer at the nickel mesh/electrolyte or nickel expanded metal/electrolyte interface. The nanostructuring of the meshes or of the expanded metals is achieved by applying nanostructured nickel particles only to the wires of the nickel mesh or only on the webs of nickel expanded metal. It is essential that only the wires or webs be coated with a layer of nickel particles in order to keep the openings of the mesh or of the expanded metal open.

PREFERRED EMBODIMENTS AND
EXEMPLARY EMBODIMENT AND
COMPARATIVE EXAMPLE

Manufacture of a Nickel Electrode According to the Invention 50 g spherical β-Ni(OH)$_2$ particles are partially reduced at a temperature of 300° C. for 4 hours in an atmosphere of 50% hydrogen in nitrogen in an annealing furnace, with the average particle diameter of about 10 μm being maintained. These partially reduced, spherical Ni/NiO particles already have an internal nanoporous structure.

A paste is prepared from 10 g of the partially reduced, spherical Ni/NiO particles with 6 ml of an aqueous solution of 7.5% polyvinyl alcohol and 10% Triton X-100 (nonionic surfactant). This paste is applied to a nickel mesh by dipping. The square nickel mesh used has a wire diameter of 150 μm and a mesh size of 1200 μm. Due to their reduced surface tension, the paste contracts on the surface of the nickel wires and releases the meshes of the nickel mesh.

After final annealing in the annealing furnace at a temperature of 620° C. in a reducing atmosphere of 50 vol. % hydrogen in nitrogen, the electrode formed can be used. The spherical nickel particles deposited on the nickel mesh have a mean diameter of 3.4 μm and have an internal nanoporous structure.

Table 1 below summarizes the mean particle sizes of the nickel hydroxide particles, the partially reduced Ni/NiO particles, and the spherical, porous nickel particles of the nickel layer used.

TABLE 1

| Specimen | Mean particle size [μm] |
|---|---|
| β-Ni(OH)$_2$ | 10.1 |
| Partially reduced Ni/NiO | 10.3 |
| Ni particles applied as coating to Ni mesh | 3.4 |

Figure 1:
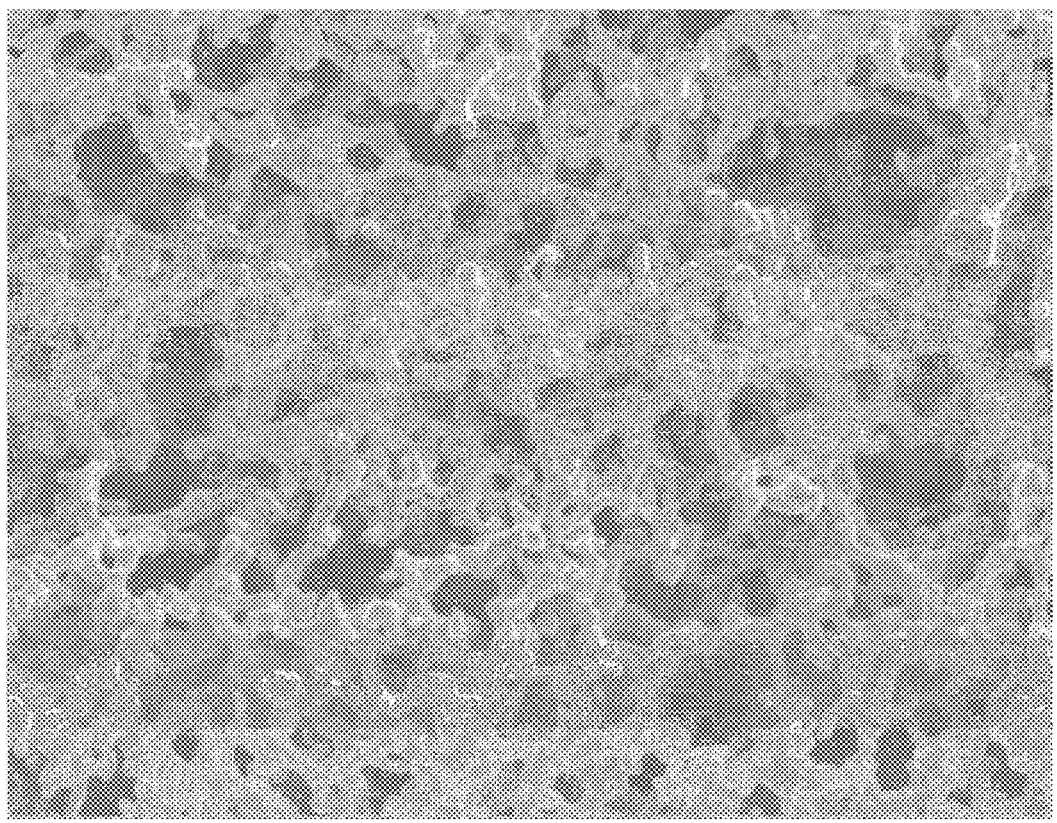
FIG. 1 shows a SEM (Scanning Electron Microscopic) image of the surface of a commercial sintered nickel electrode at 1000× magnification. (from Morioka Y., Narukawa S., Itou T., Journal of Power Sources 100 (2001): 107-116)
Figure 2:
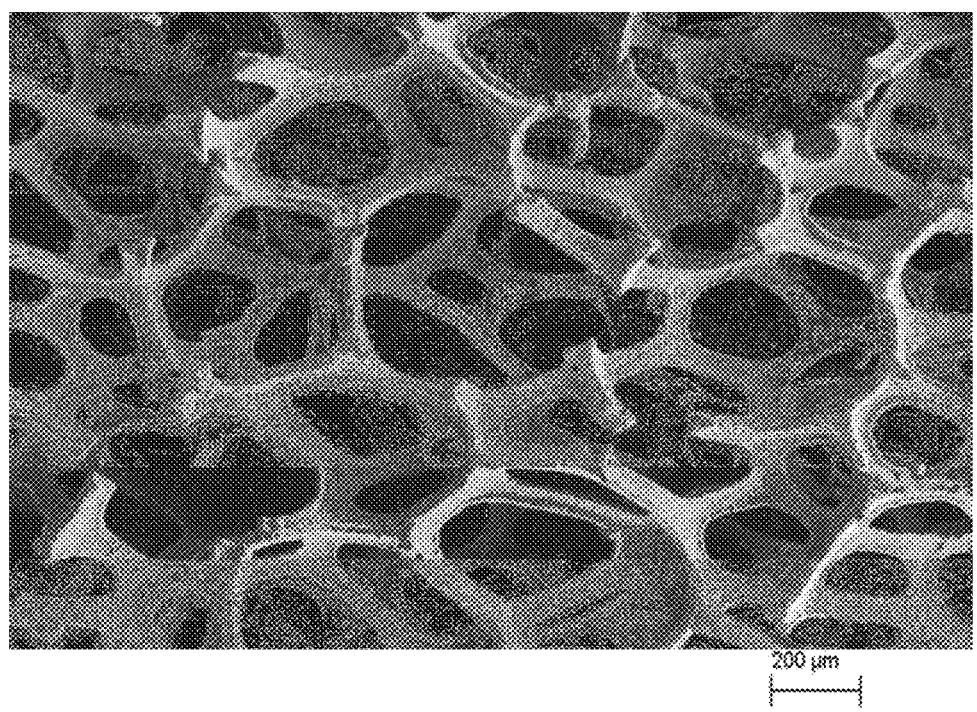
FIG. 2 shows a SEM image of the surface of a commercial nickel foam electrode with a honeycomb-like structure at 150× magnification.
Figure 3:
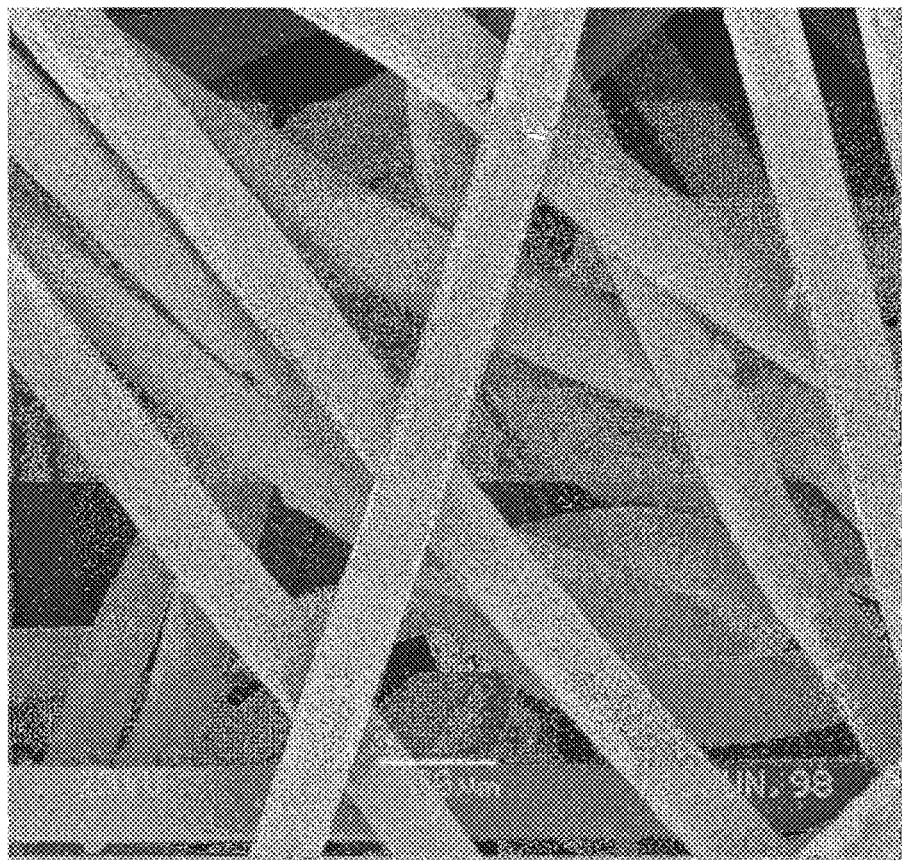
FIG. 3 shows a SEM image of the surface of a commercial nickel fiber electrode at 500× magnification. (from Ohms D., Kohlhase M., Benczur-Urmossy G., Schadlich G., Journal of Power Sources 105 (2002): 127-133)
Figure 4:
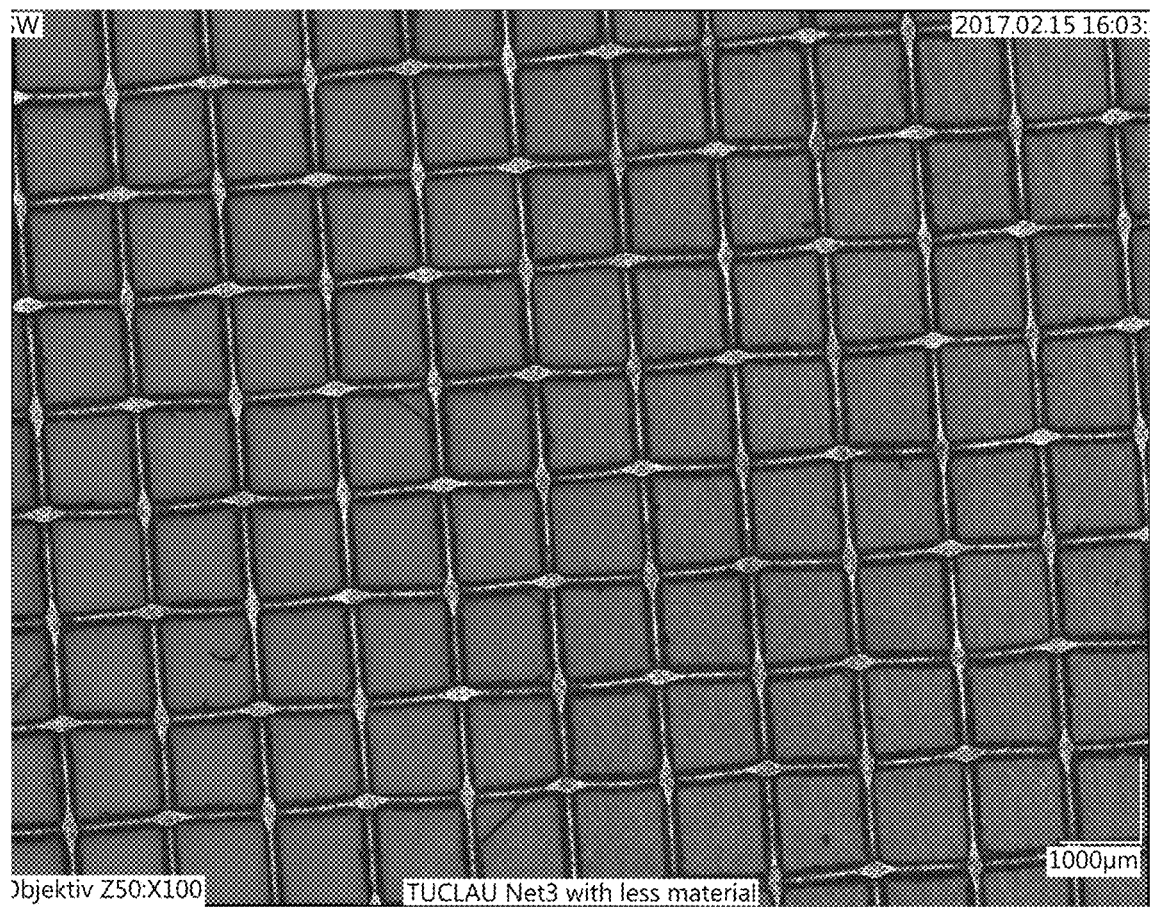
FIG. 4 shows a light microscopic overview image of the surface of a nickel electrode according to the invention as described in the following manufacturing example in the form of a nickel mesh (wire spacing 1.2 mm, wire thickness 150 μm) with a uniform coating of nanostructured nickel particles about 60 μm thick (particle size 3 to 4 μm) at 15× magnification.
Figure 5:
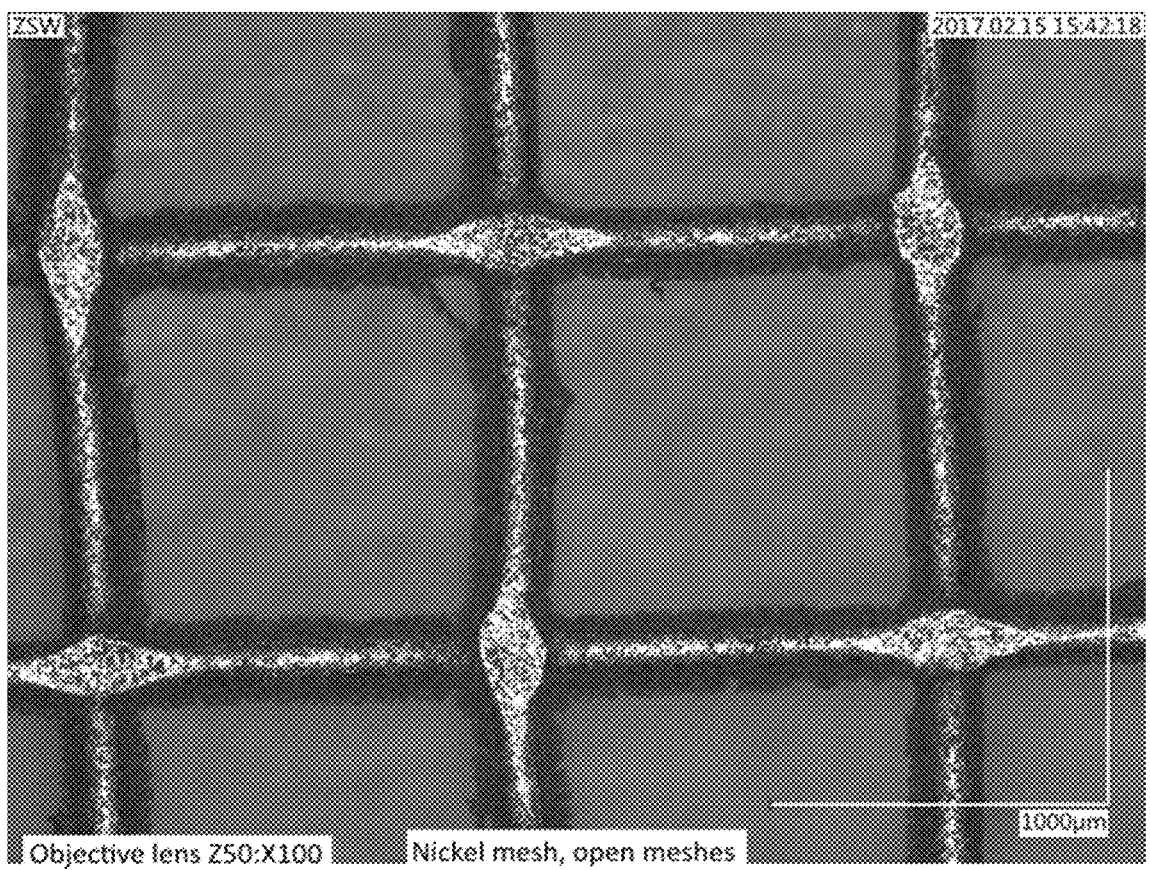
FIG. 5 shows a photomicrograph of detail of the surface of the nickel electrode of the present invention shown in FIG. 4 at 55× magnification.

A light microscopic overview image of the surface of the nickel electrode produced in this way is shown in FIG. 4, and a light microscopic image of detail of the surface of this nickel electrode is shown in FIG. 5. As can be seen from these micrographs, the mesh openings of the nickel mesh have remained open, and the coating composed of nanoporous nickel particles is disposed only on the wires of the nickel mesh.

Manufacture of a Comparative Nickel Electrode

A nickel electrode was manufactured analogously to the manufacturing example according to the invention described above, with the sole exception that no surfactant was added during the preparation of the paste.

Figure 6:
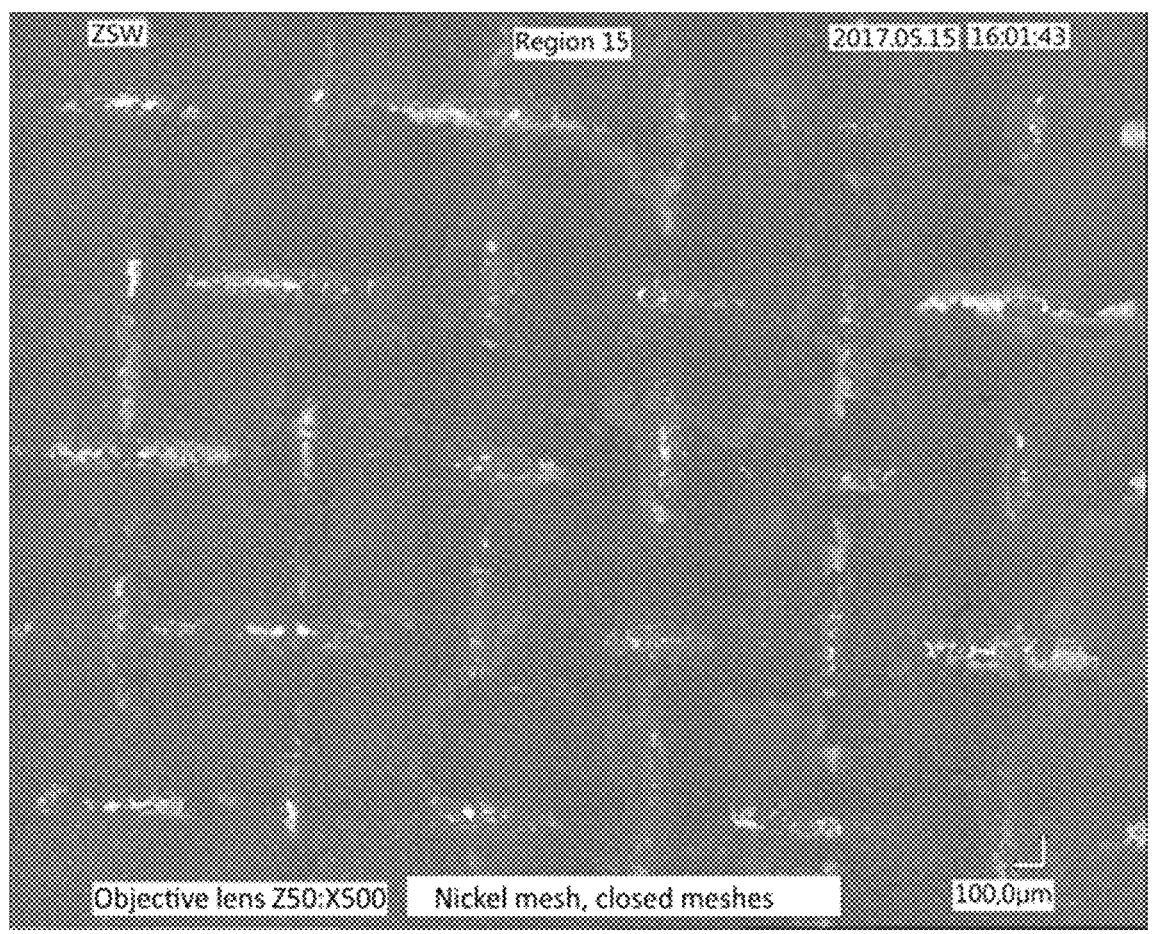
FIG. 6 shows a light microscopic overview image of the surface of a nickel electrode described in the following comparative example at 40× magnification.

A light microscopic overview image of the electrode manufactured in this way is shown in FIG. 6. It is clear from this that the mesh openings of the nickel mesh are more or less completely closed by the coating of nickel particles, which is accompanied by pronounced obstruction of the gas transport.

The invention claimed is:

1. A nickel electrode comprising an electrically conductive nickel mesh of nickel wires or a lattice-like nickel expanded metal comprising webs, and a nickel layer of mutually adherent, spherical, nanoporous nickel particles that is applied only to the wires of the nickel mesh or only to the webs of the nickel expanded metal, obtainable by a method comprising the following steps:
   a) providing spherical nickel hydroxide particles,
   b) partially reducing the spherical nickel hydroxide particles in a reducing atmosphere at temperatures of 270 to 330° C. in order to obtain partially reduced, spherical Ni/NiO particles,
   c) producing a paste from the Ni/NiO particles obtained, an organic and/or inorganic binder, a surfactant and, optionally, additional adjuvants,
   d) applying the paste as a coating to the electrically conductive nickel mesh or nickel expanded metal, and
   e) annealing the coated nickel mesh or nickel expanded metal in a reducing atmosphere at temperatures of 500 to 800° C.

2. The nickel electrode as set forth in claim 1, wherein the spherical nickel hydroxide particles provided in step a) have a mean particle size of from 0.3 to 75 μm, preferably from 3 to 30 μm, more preferably from 9 to 12 μm, especially preferably of about 10 μm.

3. The nickel electrode as set forth in claim 1, wherein the partial reduction in step b) is carried out at temperatures of 290 to 310° C.

4. The nickel electrode as set forth in claim 1, wherein both the partial reduction in step b) and the annealing in step e) are carried out in a reducing atmosphere comprising 10 to 100% hydrogen and, optionally, an inert gas.

5. The nickel electrode as set forth in claim 1, wherein, in step c), natural and/or synthetic polymers or derivatives thereof are used as organic binder, and ammonium salts or hydrazine salts are used as inorganic binder.

6. The nickel electrode as set forth in claim 1, wherein, in step c), the quantity of surfactant is from 0.1 to 20 wt % with respect to the total weight of the paste.

7. The nickel electrode as set forth in claim 1, wherein, in step c), the surfactant used to prepare the paste is selected from the group consisting of nonionic, ionic, and amphoteric surfactants.

8. The nickel electrode as set forth in claim 1, wherein the nickel layer of the nickel electrode has a thickness in the range of 1 to 1,000 μm, preferably 10 to 900 μm, more preferably 20 to 200 μm.

9. The nickel electrode as set forth in claim 1, wherein the spherical, nanoporous nickel particles have a mean particle size of from 0.1 to 25 μm, preferably from 1 to 10 μm, more preferably from 2 to 6 μm, especially preferably from 3 to 4 μm.

10. A method for manufacturing a nickel electrode as set forth in claim 1, comprising the following steps:
   a) providing spherical nickel hydroxide particles,
   b) partially reducing the spherical nickel hydroxide particles in a reducing atmosphere at temperatures of 270 to 330° C. in order to obtain partially reduced, spherical Ni/NiO particles,
   c) producing a paste from the Ni/NiO particles obtained, an organic and/or inorganic binder, a surfactant and, optionally, additional adjuvants,
   d) applying the paste as a coating to the electrically conductive nickel mesh or nickel expanded metal, and
   e) annealing the coated nickel mesh or nickel expanded metal in a reducing atmosphere at temperatures of 500 to 800° C.

* * * * *

UNITED STATES PATENT AND TRADEMARK OFFICE
CERTIFICATE OF CORRECTION

Page 1 of 1

PATENT NO. : 11,414,771 B2
APPLICATION NO. : 16/613337
DATED : August 16, 2022
INVENTOR(S) : Ludwig Jörissen, Jerry Bamfo Asante and Olaf Böse It is certified that error appears in the above-identified patent and that said Letters Patent is hereby corrected as shown below:

On the Title Page

Item (73) Assignee: Please remove the Assignee "ZENTRUM FÜR SONNENENERGIE- UND WASSERSTOFF-FORSCHUNG BADEN-WÜR TTEMBERT GEMEINNÜTZIGE STIFTUNG" and replace with "ZENTRUM FÜR SONNENENERGIE- UND WASSERSTOFF-FORSCHUNG BADEN-WÜRTTEMBERG GEMEINNÜTZIGE STIFTUNG".

Signed and Sealed this
Thirtieth Day of May, 2023

Katherine Kelly Vidal
*Director of the United States Patent and Trademark Office*